United States Patent
Marggraff et al.

(10) Patent No.: US 8,149,227 B2
(45) Date of Patent: Apr. 3, 2012

(54) REMOVING CLICK AND FRICTION NOISE IN A WRITING DEVICE

(75) Inventors: Jim Marggraff, Lafayette, CA (US);
Marc Thomas, Redwood City, CA (US);
John Hartman, Oakland, CA (US);
John Carter, Menlo Park, CA (US);
Mauricio Greene, Berkeley, CA (US);
Mike Lehr, Mountain View, CA (US);
Allan Hessenflow, Los Gatos, CA (US);
Igor Feldman, San Francisco, CA (US);
Dan Keller, Danville, CA (US); Stuart Neubarth, Mountain View, CA (US)

(73) Assignee: Livescribe, Inc., Oakland, CA (US)

( * ) Notice: Subject to any disclaimer, the term of this patent is extended or adjusted under 35 U.S.C. 154(b) by 552 days.

(21) Appl. No.: 12/415,187

(22) Filed: Mar. 31, 2009

(65) Prior Publication Data
US 2010/0054845 A1    Mar. 4, 2010

Related U.S. Application Data

(60) Provisional application No. 61/042,254, filed on Apr. 3, 2008.

(51) Int. Cl.
*G09G 5/24* (2006.01)

(52) U.S. Cl. ........... 345/179; 401/195; 401/52; 347/109
(58) Field of Classification Search ............ 401/195, 401/52, 54; 347/109; 345/179; 178/19.04
See application file for complete search history.

(56) References Cited

U.S. PATENT DOCUMENTS

| | | | |
|---|---|---|---|
| 5,215,397 A * | 6/1993 | Taguchi et al. | 401/194 |
| 5,461,204 A | 10/1995 | Makinwa et al. | |
| 5,518,330 A | 5/1996 | Gervais et al. | |
| 7,147,392 B2 | 12/2006 | Bedhome et al. | |
| 7,175,095 B2 | 2/2007 | Pettersson et al. | |
| 7,281,664 B1 | 10/2007 | Thaeler et al. | |

(Continued)

FOREIGN PATENT DOCUMENTS

WO    WO 2007/141204 A1    12/2007

OTHER PUBLICATIONS

PCT International Search Report and Written Opinion, PCT Application No. PCT/US2009/039218, dated May 26, 2009, 8 pages.

*Primary Examiner* — Dinh Nguyen
*Assistant Examiner* — Jennifer Gordon
(74) *Attorney, Agent, or Firm* — Fenwick & West LLP

(57) ABSTRACT

Systems for removing or attenuating friction and/or click noise generated during writing with a smart pen are disclosed. In a smart pen, the writing cartridge is biased towards a first side of the smart pen internal cavity by a low-force biasing system without affecting writing cartridge movement. For example, the writing cartridge is comprised of a magnetic material and a magnet is embedded into the first side of the smart pen internal cavity to bias the writing cartridge towards the first side. Alternatively, the material comprising the writing cartridge or smart pen internal cavity is modified, reducing friction between the components. As another alternative, a DSP method identifies analyzes one or more parameters of received audio data to differentiate click noise from audio data, and may receive data from a movement sensor indicating when the writing cartridge has moved to reduce power consumption for identifying click noise.

14 Claims, 5 Drawing Sheets

U.S. PATENT DOCUMENTS

| | | | |
|---|---|---|---|
| 7,729,520 B2 * | 6/2010 | Kempf | 382/119 |
| 2001/0050677 A1 | 12/2001 | Tosaya | |
| 2001/0055411 A1 | 12/2001 | Black | |
| 2004/0229195 A1 | 11/2004 | Marggraff et al. | |
| 2006/0033725 A1 | 2/2006 | Marggraff et al. | |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1 | 4/2006 | Marggraff et al. | |
| 2006/0080609 A1 | 4/2006 | Marggraff et al. | |
| 2006/0125805 A1 | 6/2006 | Marggraff et al. | |
| 2006/0127872 A1 | 6/2006 | Marggraff et al. | |
| 2006/0287857 A1 | 12/2006 | Saffer | |
| 2006/0292543 A1 | 12/2006 | Marggraff et al. | |
| 2007/0005849 A1 | 1/2007 | Oliver | |
| 2007/0046654 A1 * | 3/2007 | Tomiya | 345/179 |
| 2007/0097100 A1 | 5/2007 | Marggraff et al. | |
| 2007/0114367 A1 * | 5/2007 | Craven-Bartle et al. | 250/227.13 |
| 2007/0280627 A1 | 12/2007 | Marggraff et al. | |
| 2007/0298877 A1 * | 12/2007 | Rosenberg | 463/30 |
| 2008/0257613 A1 * | 10/2008 | Katsurahira | 178/19.04 |
| 2010/0328272 A1 * | 12/2010 | Craven-Bartle et al. | 345/179 |

* cited by examiner

REMOVING CLICK AND FRICTION NOISE IN A WRITING DEVICE

CROSS REFERENCE TO RELATED APPLICATIONS

This application claims the benefit of U.S. Provisional Application No. 61/042,254, filed Apr. 3, 2008, which is incorporated by reference in its entirety.

BACKGROUND

This invention relates generally to pen-based computing systems, and more particularly to attenuating friction noise or click noise captured by an audio recording device embedded in a smart pen.

As audio recording device size has decreased while recording quality has increased, use of audio recording devices as standalone devices or as components of other devices has become more common. For example, it has become common to include audio recording devices in writing devices, such as including an embedded audio recording device in a digital pen or "smart pen." This embedded audio recording device allows the smart pen to be used for both writing and recording audio while writing.

However, noise caused by writing with the smart pen often compromises the quality of audio captured by the embedded audio recording device. One primary source of noise while writing, or "writing noise," is "friction noise" which is produced as the tip of the smart pen moves across a writing surface. Another source of writing noise is "click noise" which occurs when the tip of the smart pen contacts the writing surface or is lifted from the writing surface. Typical implementations of smart pens allow these types of writing noises to be captured loudly enough to distort other audio data.

Generally, smart pens employ a switch mechanism using a graphite or ink writing cartridge to activate a force sensing resistor ("FSR"), or other sensor such as a strain gauge, piezoelectric force sensor, or optical sensor detecting contact between writing surface and smart pen tip, to notify the smart pen system that the tip of the smart pen has contacted a writing surface or has been removed from contacting a writing surface. To allow the writing cartridge to freely move in and out of the smart pen and activate or deactivate the FSR, smart pens are commonly designed so that the interior bore diameter of the smart pen is sufficiently larger than the writing cartridge's external diameter. This design reduces the likelihood that the writing cartridge will become stuck in the smart pen's internal cavity or that the smart pen will cause friction preventing proper activation of the FSR and accurate capture and digitization of the writing.

However, designing the internal cavity diameter of the smart pen to be sufficiently larger than the external bore diameter of the writing cartridge allows the writing cartridge to contact the internal cavity of the smart pen when the writing cartridge contacts a writing surface. The size difference between the smart pen internal diameter and the writing cartridge external diameter also allows the cartridge to contact the internal cavity of the smart pen when the smart pen tip is lifted from the writing surface. Additionally, friction and/or click noise caused by writing with the smart pen can be captured by the embedded audio recording device externally through the air ("aurally") or internally through component coupling and/or internal air cavities inside the pen ("mechanically").

Accordingly, there is a need for a system and method to remove or attenuate the friction and/or click noise captured by an embedded audio recording device during writing with a smart pen.

SUMMARY

The described embodiments present a system and method for removing or attenuating friction and/or click noise generated during writing with a smart pen. In one embodiment, the writing cartridge is biased towards the side of the internal cavity of the smart pen using a low-force system that does not introduce sufficient friction to affect operation of the force sensing resistor ("FSR"). For example, the writing cartridge is comprised of a magnetic material, such as steel, and a magnet is embedded into a first side of the smart pen's internal cavity, biasing the writing cartridge towards one side of the bore. Other methods, such as coupling a rotational friction joint to the writing cartridge or modifying the material used to construct the writing cartridge and/or smart pen internal cavity can be used to mechanically attenuate click and/or friction noise.

In another embodiment, digital signal processing (DSP) methods are used to identify and remove click noise. For example, a DSP method identifies the presence of click noise by analyzing one or more parameters of received audio data to differentiate click noise from audio data. Additionally, the DSP method receives data indicating when the FSR is closed or open, allowing the search for click noise to be narrowed to FSR closing or FSR opening events. This reduces the power consumption needed to identify click noise while simplifying the DSP algorithm's ability to identify click noise.

DETAILED DESCRIPTION

Overview of Pen-Based Computing System

Figure 1:
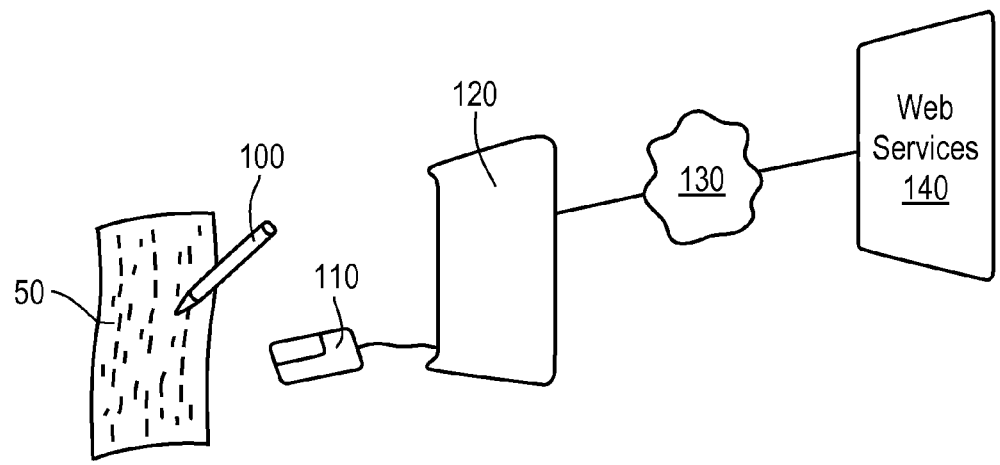
FIG. 1 is a schematic diagram of a pen-based computing system, in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains, including electronic paper.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information, playing audio or responding in context to physical interaction such as tapping, tracing, or selecting other pre-existing visual information. In other embodiments, the smart pen 100 includes additional input modalities, such as motion sensing or gesture capture, and/or additional output modalities, such as vibrational feedback. By receiving different types of input, the smart pen 100 may simultaneously capture different types of data, such as audio, movement and/or written or text, which can be used to generate a session including different types of data.

Figure 2:
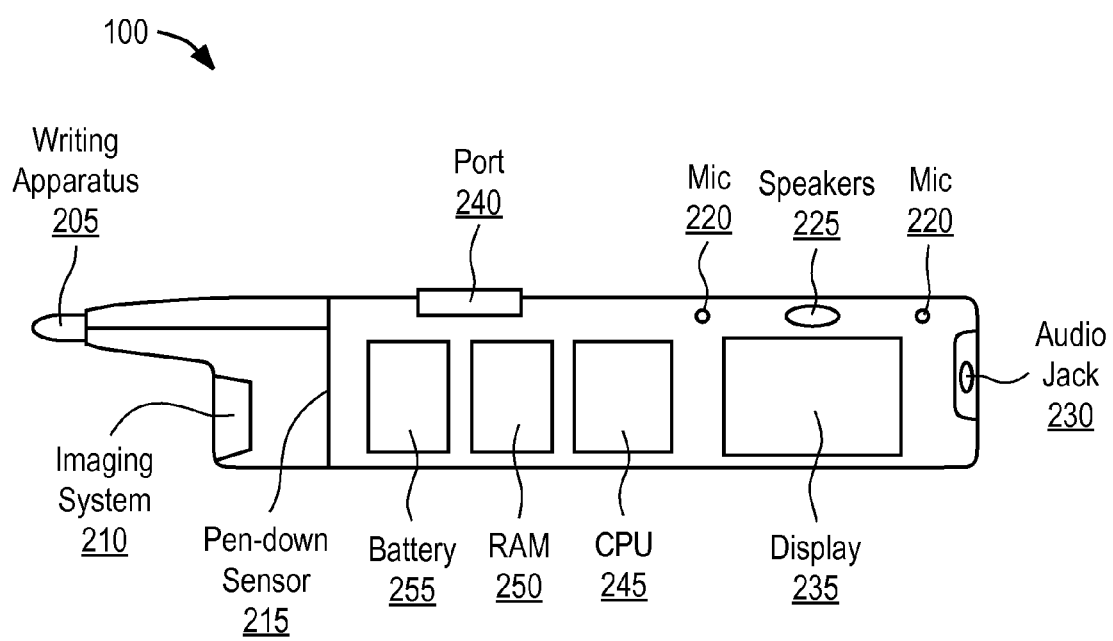
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system. For example a variety of types of switches including buttons, rocker panels, capacitive sensors, heat sensors, pressure sensors, biometric sensors or other sensing devices could be added.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50, entirely by the smart pen 100, or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sense movement of the smart pen 100 tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications, such as Bluetooth, WiFi, RF, infrared and ultrasonic sound. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also employ buttons, such as a power button or an audio recording button and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and/or gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use other appropriate means for achieving the same function. In an embodiment, data captured by the imaging system 210 is subsequently processed, allowing one or more content recognition algorithms, such as character recognition, to be applied to the received data.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100.

In an embodiment, the operating system and applications support a sequence of independent and/or concurrent input and output modalities and seamless transitions between these modalities to provide for language learning. For example, a language learning (LL) application running on an operating system supporting modality independence, concurrence and sequencing might begin a lesson announcing that today is a lesson in writing, reading, speaking and listening to Chinese. The smart pen 100 might then animate the creation of a Mandarin character, drawing strokes of the character in proper order on the display 235, while simultaneously announcing the character's pronunciation via the speaker 225. The operating system would enable the simultaneous display and synchronized delivery of audio. The LL application might then prompt the user to draw each stroke of the character, following the animated display of each stroke on the display 225, thus sequencing the transition between modalities of visual output of information displayed on the smart pen 100, in a synchronized manner, with the input of stroke data by a user. As the user becomes more fluent with the creations of the character, and begins writing more rapidly, perhaps writing ahead of the strokes displayed, the OS will enable real time capture and interpretation of strokes and respond with proper displaying and audio as appropriate, engaging the user in a multimodal dialogue. As the user demonstrates proficiency in writing, and the smart pen 100 begins to be lead by the user, displaying strokes in response, rather than leading with strokes, the smart pen 100 might verbally compliment the user and request the user to speak the sound for the character during or after the stroke writing. As the user speaks the character sound, the smart pen 100 could record the sound and compare it to an exemplar. The smart pen 100 might then prompt the user by playing back the exemplar pronunciation and the user pronunciation, providing commentary and/or visual guidance regarding correctness in pronunciation The smart pen 100 might then prompt the user to listen, write, and speak, announcing a series of words one by one, waiting for the user to write and speak the words, while comparing the input speech and writing to exemplars, and redirecting the user to repeat writing or speaking as necessary.

In an extension of this example, the smart pen 100 might prompt the user to interact with a pre-printed Language Learning text or workbook. The smart pen 100 might move the user's attention among multiple displays, from text, to the workbook, to a user's notebook, while continuing a dialogue involving the smart pen 100 speaking and displaying independently or concurrently, directing the user to speak, write, and look at information independently or concurrently. Various other combinations of input modalities and output modalities, and sequencing, are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword or a physical motion, may indicate that subsequent input is associated with one or more application commands. Input with a spatial and/or temporal component may also be used to indicate that subsequent data. Examples of input with a spatial input include two dots side-by-side. Examples of input with a temporal component include two dots written one immediately after the other. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Radially Biasing the Writing Cartridge

Figure 3:
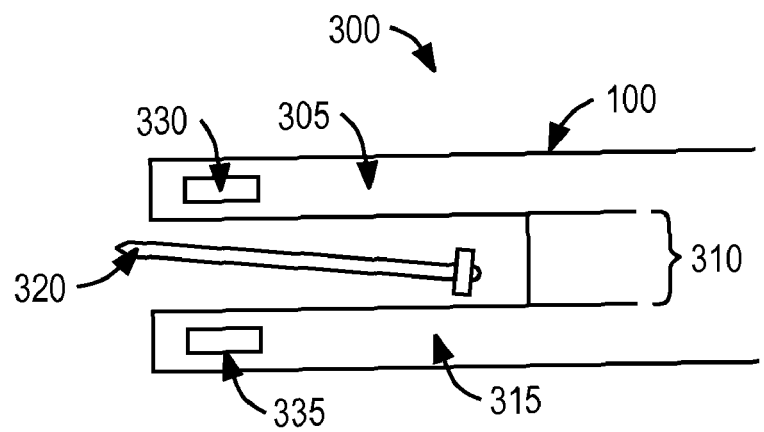
FIG. 3 is a diagram of a system for radially biasing a writing cartridge towards a first side of a smart pen internal cavity in accordance with an embodiment of the invention.

FIG. 3 is a diagram of a system 300 for radially biasing a writing cartridge 320 towards a first side 305 of a smart pen internal cavity 310 in accordance with an embodiment of the invention. This biasing prevents the writing cartridge 320 from contacting the smart pen internal cavity 310 when the smart pen contacts a writing surface 50 or from moving away from the smart pen internal cavity 310 when the smart pen is removed from a writing surface 50. A low-force biasing system is used so that the writing cartridge 320 is biased without generating friction between the writing cartridge 320 and smart pen internal cavity 310, which might otherwise prevent the writing cartridge 320 from properly activating or deactivating a force sensing resistor ("FSR").

In one embodiment, the writing cartridge 320 comprises a magnetic material, such as steel, and a magnet 330 is embedded in the first side 305 of the smart pen internal cavity 310 or placed inside the smart pen internal cavity 310 and recessed to prevent contacting the writing cartridge 320. For example, a single magnet 330 is embedded in the first side 305 of the smart pen internal cavity 310 near the tip of the smart and proximate to the upper side of the smart pen barrel (i.e., the side of the smart pen barrel farthest from the writing cartridge 320). The magnet 330 is sized and placed within or adjacent to the smart pen internal cavity 310 to exert a radial force, based on the coefficient of friction of the material comprising the writing cartridge 320 material and of the material comprising smart pen internal cavity 310, to produce a contributory axial resistance that does not impair the function of the FSR. When a user lifts the smart pen 100 from a writing surface 50, the magnetic force maintains the position of the writing cartridge 320 against the first side 305 of the smart pen internal cavity 310 or reduces the velocity of the writing cartridge 320 falling against a second side 315 of the smart pen internal cavity 310. This attenuation of writing cartridge 320 movement reduces click noise.

In an embodiment, the magnet 330 is a cylindrical magnet embedded inside the smart pen 100 along the circumference of the smart pen internal cavity 310. Alternatively, one or more additional magnets 335 are embedded inside the smart pen 100 at one or more locations along the circumference of the smart pen internal cavity 310. Using a cylindrical magnet or one or more additional magnets 335 along the circumference of the smart pen internal cavity 310 magnets biases the writing cartridge 320 towards whatever side the writing cartridge 320 is pushed when the user begins writing with the smart pen 100. For example, if the writing cartridge is pushed towards the second side 315 of the smart pen internal cavity 310, using a cylindrical magnet or one or more additional magnets 335 bases the writing cartridge 320 toward the second side 315 of the smart pen internal cavity 310. As the smart pen 100 experiences small changes in orientation from stroke to stroke, the cylindrical magnet or the magnet 330 and the one or more additional magnets 335 ensure that the writing cartridge 320 is biased against a side of the smart pen internal cavity 310. This configuration allows the writing cartridge 320 to incrementally move around the interior circumference of the smart pen internal cavity 310, reducing the distance traveled by the writing cartridge 320 during different writing strokes, attenuating or removing click noise.

Figure 4A:
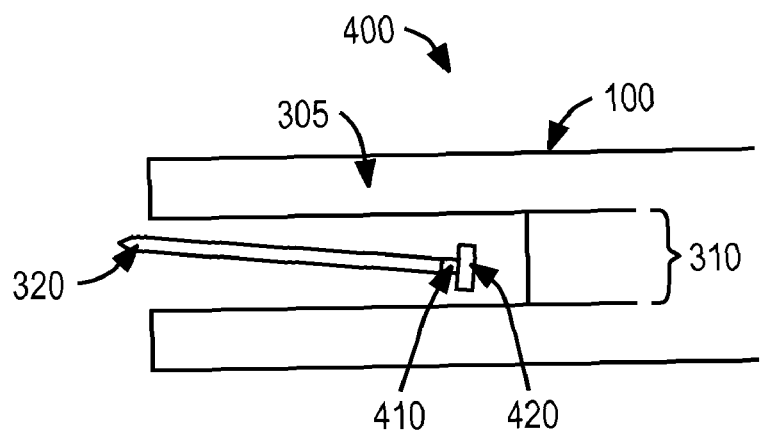
FIG. 4A is a diagram of another system for biasing a writing cartridge towards a first side of a smart pen internal cavity in accordance with an embodiment of the invention.

FIG. 4A shows an alternative system 400 for biasing the writing cartridge 320 towards a first side 305 of the smart pen internal cavity 310 using a rotational friction system 410. In one embodiment, the rotational friction system 410 is positioned at the distal end of the writing cartridge and coupled to an activator 420 which contacts an FSR. The rotational friction system 410 allows the activator 420 to feely contact the FSR while biasing the writing cartridge tip towards the first side 305 of the smart pen internal cavity 310. As the rotational friction system 410 allows rotation in a first direction while resisting rotation in a second direction, the writing cartridge 320 is biased against the first side 305 of the smart pen internal cavity without affecting the ability to retract the writing cartridge 320 into the smart pen 100.

In another embodiment, the rotational friction system 410 is replaced by a mechanical spring force, such as a leaf spring, or a damping element, such as felt or other material, which provides a force perpendicular to the axial movement of the smart pen without impeding axial movement of the cartridge. Alternatively a strain gauge, such as a linear force sensor, detects changes in force to identify when the smart pen 100 contacts a writing surface 50. The linear force sensor provides greater accuracy by detecting an analog range of forces rather than the discrete force levels identified by the FSR.

Figure 4B:
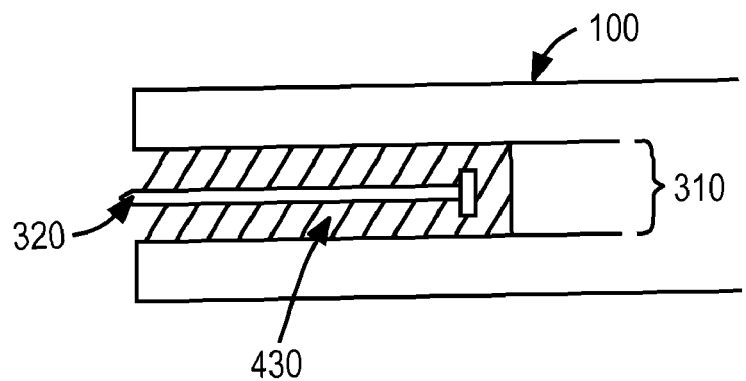
FIG. 4B is a diagram of a system for isolating a writing cartridge from the sides of the smart pen internal cavity in accordance with an embodiment of the invention.

Alternatively, as illustrated in FIG. 4B, the smart pen internal cavity 310 is filled with a viscous material 430 so that the writing cartridge 320 is isolated from the sides of the smart pen internal cavity 310 by the viscous material. In yet another embodiment, a busing element suspends the writing cartridge 320 or the smart pen internal cavity 310 is tapered to become narrower at the tip. Alternatively, an optical sensor, such as the dot position sensor, optically detects clicks and a digital signal processor ("DSP") uses digital signal processing methods to attenuate noise caused by the clicks. For example, changes in the focus of the optical sensor determine how close the tip of the writing cartridge is to a writing surface and when the optical sensor focus indicates the tip of the writing cartridge is near the writing surface, a click is detected.

Component Specific Attenuation of Click Noise

Figure 5A:
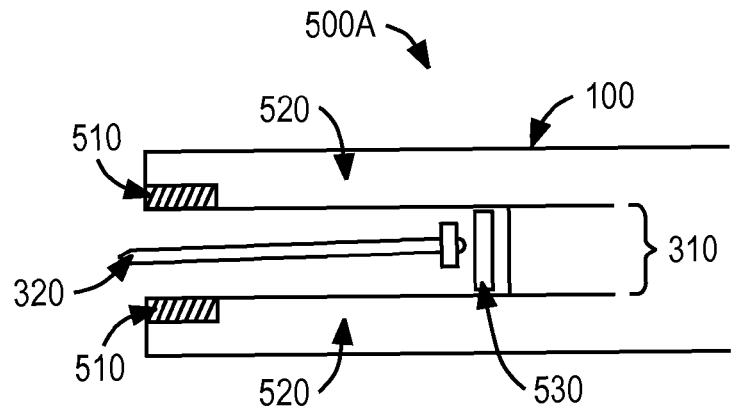
FIG. 5A is a diagram of a system for reducing click noise generated by a smart pen by modifying components of the smart pen in accordance with an embodiment of the invention.

FIG. 5A shows a system 500A for reducing click noise generated by a smart pen 100 by one or more components of the smart pen 100. In an embodiment, the material comprising the smart pen internal cavity 310 is modified at a contact point 510 between the writing cartridge 320 and the smart pen internal cavity 310. Hence, the contact point 510 between the smart pen internal cavity 310 and the writing cartridge 320 is constructed from a different material than the remainder 520 of the smart pen internal cavity 310. For example the contact point 510 comprises a soft plastic while the remainder 520 of the smart pen internal cavity 310 comprises a harder plastic or other harder material. Alternatively, the writing cartridge 320 includes a metal tip while contact point 510 is proximate to, or comprises, one or more magnets which reduce impact between the writing cartridge 320 and the smart pen internal cavity 310.

Figure 5B:
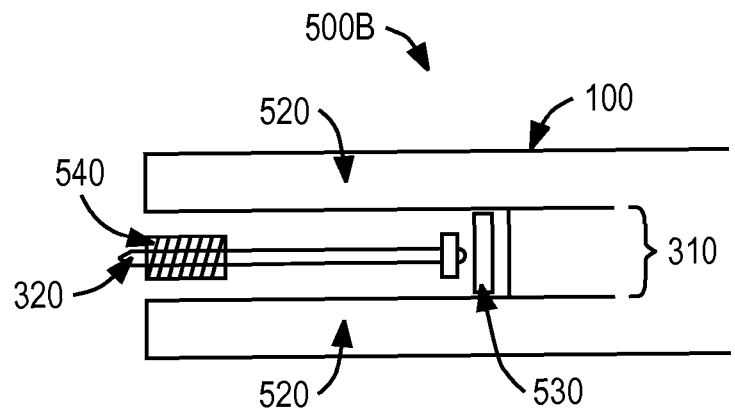
FIG. 5B is a diagram of an alternative system for reducing click noise generated by a smart pen in accordance with an embodiment of the invention.

Alternatively, as shown in FIG. 5B, another system 500B reduces click noise by adding material 540 inside the smart pen internal cavity 310 or outside of the writing cartridge 320 to reduce noise generated by contact between the writing cartridge 320 and the smart pen internal cavity 310. For example, the material 540 comprises rubberized paint or heat shrink tubing added to the writing cartridge 320 or to the smart pen internal cavity 310.

Figure 5C:
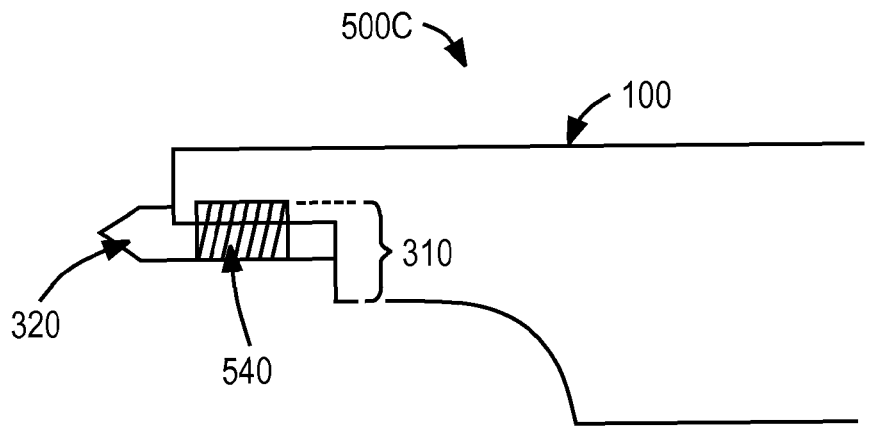
FIG. 5C is a diagram of an another system for reducing click noise generated by a smart pen in accordance with an embodiment of the invention

In another alternative system 500C, shown in FIG. 5C, the smart pen 100 is constructed so the smart pen internal cavity 310 does not completely enclose the writing cartridge 320 near the tip of the writing cartridge 320. For example, the smart pen internal cavity 310 has a design similar to the design of a fountain pen. Such a design is less likely to introduce axial friction from moving the writing cartridge 320 in and out of the smart pen internal cavity 310.

Additionally, the smart pen internal cavity 310 can be designed to dampen sound transmission within the smart pen internal cavity 310 without introducing axial friction. For example, to attenuate click noise transmitted mechanically or by air transmission within the smart pen, vibration can be dampened at the point where the vibration enters the microphone using a flexible mounting method to decouple the audio recording device from the smart pen 100. Alternatively, the audio recording device chamber is sealed, allowing acoustic data from outside the smart pen 100 to be captured while acoustic data produced by resonance or transmission within the smart pen 100 is not captured. Alternatively, damping methods are applied at a location in the smart pen 100 above the force sensing resistor ("FSR") to mechanically isolate the writing cartridge 320 and lower smart pen housing from an audio recording device included on the smart pen 100.

Alternatively, acoustic methods may be used to attenuate the click noise. For example, a plurality of microphones and beam forming techniques are used to create a cardioids pattern having a null directed towards the smart pen tip to reduce click nose. Or, a plurality of microphones are used in conjunction with adaptive noise reduction, such as least mean squares (LMS) noise reduction, to attenuate click nose. In an embodiment, a microphone and a mechanical vibration sensor communicate with each other to subtract mechanical noise from audio data using adaptive noise reduction or another suitable technique.

As another alternative, a digital signal processing (DSP) algorithm identifies the presence of click noise based on one or more parameters. For example, a time based signature of contact between writing cartridge 320 and smart pen internal cavity 310 is used to identify click nose. In an embodiment, the average power of a detected signal over a defined time interval is compared to an instantaneous value, and if the comparison result exceeds a threshold value, a noise correction process is applied to remove the click noise. Alternatively, other parameters, such as frequency domain energy duration or characteristics, can be used to differentiate click noise from audio data. Or, in another alternative embodiment, click noise is identified using correlation based detection comparing the detected signal to a reference signal or derived click noise signal. In yet another embodiment, click noise is detected by computing, in real time, the smoothed high frequency and low frequency power in signal samples and comparing the computed high frequency and low frequency power values to a threshold value. If the comparison results exceed the threshold value, the signal sample is classified as click noise.

Figure 6:
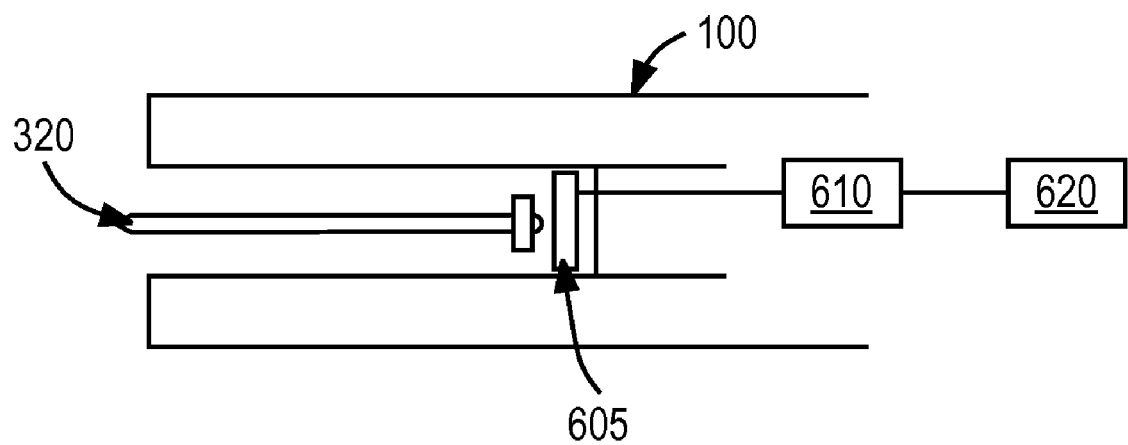
FIG. 6 is a diagram of a system for reducing click noise using a buffer in accordance with an embodiment of the invention.

As shown in FIG. 6, the DSP algorithm identifying click noise can receive additional input to more accurately identify click noise and reduce algorithm complexity. In an embodiment, a movement sensor 610 is coupled to a force sensing resistor ("FSR") 605 and captures data from the FSR 605 indicating when the FSR is opened or closed, corresponding to movement of the writing cartridge 320, data from the movement sensor 610 is communicated to the DSP algorithm. Data from the movement sensor 610 allows the DSP algorithm to conserve processor resources by searching for click noise responsive to receiving input identifying opening or closing of the FSR 605. Further, input describing opening or closing of the FSR 605 allows real-time removal of click noise while also allowing delayed click detection. In one embodiment, a buffer 620, coupled to the movement sensor 610, digitally buffers audio data, allowing the DSP algorithm to access audio data captured prior to the FSR 605 opening or closing. This buffer 620 allows removal of click noise in real-time by, for example, replacing click noise with audio data sampled prior to FSR 605 opening or closing. In one embodiment, audio data captured prior to FSR 605 opening or closing can be played in reverse and/or with cross fade to reduce artifacts. Alternatively, the buffer 620 replaces detected click noise with white noise or other data, replaces click noise with a linear prediction of the undistorted audio data, replaces click noise with silence or replaces the click noise with other suitable audio data. Alternatively, a limiter, infinite compressor or other regulating device is used to clip click noise when it reaches a maximum value, such as a decibel or power threshold.

A combination of mechanical filtering and processing methods can be used to attenuate or remove friction noise caused by the contact of the smart pen tip against the writing surface. Mechanical isolation methods, such as providing a boot around the audio recording device, isolate the audio recording device from noise within the smart pen body. Additional methods can also be employed to further dampen friction noise, such as viscous-elastic elements like putty or dual sided tape.

Figure 7:
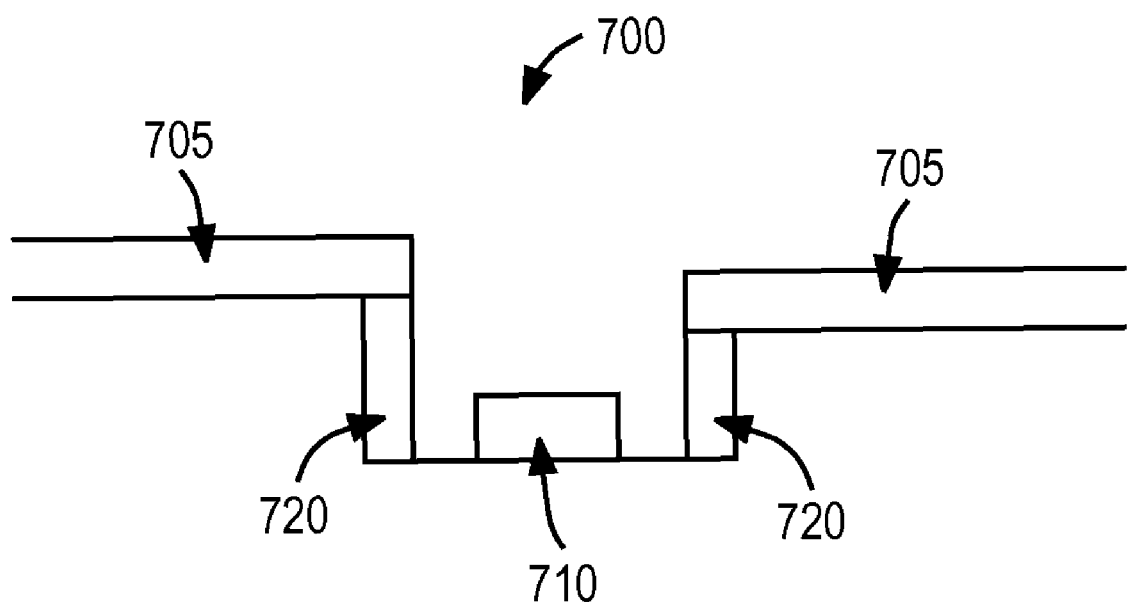
FIG. 7 is a diagram of a system for reducing friction noise by isolating a diaphragm of an audio recording device included in a smart pen in accordance with an embodiment of the invention.

FIG. 7 shows a system 700 for reducing friction noise where a diaphragm 710 of a microphone 220, or other audio capture device, are bonded to a bezel 705 or other mounting surface. Seals 720 isolate the diaphragm 710 from internal acoustics. In an embodiment, flexible wire having a fine gauge is used to isolate vibrations of the audio recording device from circuit connections. Alternatively, the audio recording device is isolated in a discrete environment, such as a rubber boot. In an embodiment, the seals 720 comprise mounting elements, such as small feet or spacers which provide additional low pass filtering of friction noise.

In addition to the mechanical filtering methods described above, processing methods, such as spectral subtractive filtering or adaptive filtering techniques can also be used to further reduce friction noise. In an embodiment, one or more microphones and/or vibration sensors are used in performing a processing method, such as adaptive filtering.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A smart pen device for attenuating click noise generated during writing comprising:
    one or more microphones coupled to a processor for capturing audio data;
    an onboard memory coupled to the processor and computer program instructions stored on the onboard memory causing the processor to store the audio data captured by the one or more microphones in the onboard memory;
    a writing cartridge comprising a magnetic material for producing written data; and
    a low-force biasing system comprising:
    a first magnet embedded and recessed into a first side of an internal cavity of the smart pen, the first side perpendicular to the direction in which the writing cartridge applies a force to a writing surface; and
    a second magnet embedded and recessed into a second side of the smart pen internal cavity, the second side perpendicular to the direction in which the writing cartridge applies the force to the writing surface,
    the first magnet and second magnet each exerting a radial force biasing the writing cartridge towards the first side of the smart pen internal cavity or the second side of the smart pen internal cavity.

2. The smart pen device of claim 1, wherein
    the radial force is dependent on a coefficient of friction associated with the internal cavity of the smart pen and a coefficient of friction associated with the writing cartridge.

3. The smart pen device of claim 1, wherein the internal cavity comprises:
    a first material not contacting the writing cartridge; and
    a second material coming into contact with the writing cartridge at one or more contact points, the second material being softer than the first material.

4. The smart pen device of claim 3, wherein the writing cartridge comprises:
    a damping material on an outer surface of the writing cartridge proximate to the one or more contact points.

5. The smart pen device of claim 4, wherein the damping material comprises rubberized paint or heat shrink tubing.

6. The smart pen device of claim 1, further comprising:
    a force sensing resistor coupled to the writing cartridge for detecting contact between the writing cartridge and the writing surface;
    a movement sensor coupled to the force sensing resistor and to the processor for determining movement of the writing cartridge; and
    wherein the computer program instructions further include instructions for identifying click noise and suppressing the click noise responsive to the movement sensor determining the writing cartridge has moved.

7. The smart pen device of claim 6, further comprising:
    a buffer coupled to the processor, to the one or more microphones and to the movement sensor, the buffer storing audio data captured from the one or more microphones; and
    a computer program code stored on the memory and configured to be executed by the processor, the computer program code including instructions for replacing the click noise with the audio data stored in the buffer responsive to the movement sensor determining the writing cartridge has moved.

8. The smart pen device of claim 7, wherein replacing the click noise with audio data stored in the buffer comprises:
    generating undistorted audio data comprising a linear prediction from audio data stored in the buffer.

9. The smart pen device of claim 6, wherein suppressing the click noise responsive to the movement sensor determining the writing cartridge has moved comprises:
    replacing the click noise with white noise.

10. The smart pen device of claim 6, wherein suppressing the click noise responsive to the movement sensor determining the writing cartridge has moved comprises:
    replacing the click noise with silence.

11. The smart pen device of claim 6, wherein identifying click noise comprises:
    applying a digital signal processing algorithm to the audio data captured by the one or more microphones, the digital signal processing algorithm analyzing one or more parameters of the audio data.

12. The smart-pen device of claim 11, wherein the one or more parameters of the audio data comprises:
    a comparison of an average power over a predefined interval associated with the audio data captured by the one or more microphones with an instantaneous power associated with the audio data captured by the one or more microphones.

13. The smart-pen device of claim 11, wherein the one or more parameters of the audio data comprises:
    a comparison between the audio data captured by the one or more microphones and reference data.

14. The smart-pen device of claim 13, wherein the reference data comprises a derived click noise signal.

* * * * *